United States Patent [19]

Pardikes et al.

[11] 4,224,156
[45] Sep. 23, 1980

[54] WEIR SKIMMER

[75] Inventors: Dennis G. Pardikes, Chicago; William F. Flowers, Bollingbrook; Al S. Huff, Country Club Hills; Andrew J. Young, Barrington, all of Ill.

[73] Assignee: Nalco Chemical Company, Oak Brook, Ill.

[21] Appl. No.: 959,263

[22] Filed: Nov. 9, 1978

[51] Int. Cl.² .............................................. B01D 23/00
[52] U.S. Cl. .................................... 210/123; 210/170; 210/252; 405/74; 405/89
[58] Field of Search ...................... 405/74, 77, 78, 80, 405/83, 87–89, 92, 93, 104, 107, 127, 57–72; 210/170, 136, 97, 252, 262, 54 R, 119, 100, 161

[56] References Cited

U.S. PATENT DOCUMENTS

| 494,209 | 3/1893 | Krampf | 210/262 X |
|---|---|---|---|
| 706,526 | 8/1902 | Carlisle | 405/88 |
| 781,093 | 1/1905 | Post | 405/88 |
| 853,146 | 5/1907 | Gerstenbergk-Zech | 405/104 X |
| 2,055,808 | 9/1936 | Wait | 210/170 X |
| 3,070,963 | 1/1963 | Dubouchet | 405/89 |
| 3,252,576 | 5/1966 | Miller | 405/104 X |
| 3,843,520 | 10/1974 | Bottorf | 210/242 R X |
| 4,089,831 | 5/1978 | Chambers | 210/54 R X |
| 4,134,863 | 1/1979 | Fanta et al. | 210/54 R |

FOREIGN PATENT DOCUMENTS 63629 9/1955 France ........................... 405/88

Primary Examiner—Dennis L. Taylor
Attorney, Agent, or Firm—John G. Premo; Robert A. Miller

[57] ABSTRACT

An apparatus for controlling the liquid level of overflow ponds and the like. It comprises a vertical standpipe having a polymer feed inlet near its bottom, a valve for controlling flow of polymer to the polymer feed inlet, at least 1 fluid discharge inlet near the bottom of the vertical standpipe. A flexible hose connects the fluid discharge inlet to a corresponding opening located in a horizontal plate which is adapted to ride up and down on the standpipe. The horizontal plate is fitted with a float, filter and a valve shut off plunger.

2 Claims, 3 Drawing Figures

WEIR SKIMMER

INTRODUCTION

In the past water drainage and flood drainage from surface, underground, or other types of mining operations was simply pumped or drained into naturally occurring receiving streams that allowed for the eventual disposal of this type of water. These waters often contain one or more hazardous substances. The Environmental Protection Agency now requires that these waters be contained and treated to remove these hazardous substances prior to release into streams, rivers, etc.

Many approaches have been used to contain and treat mine drainage and waters. Among the types of technology used there is a ponding and settling system that relies on natural or man-made grades that occur in the topography of the surrounding areas. Grading of the land allows for the collection of water into pond systems for its retention and treatement. Allowing the water to be retained often improves its quality simply by physically separating solid suspended matter from the water itself. However, unusually large ponds may be required to obtain desirable results and this is costly in land use acreage and original construction expense. In systems of this type, the ponds are usually connected by means of a standpipe and drain line which allows the water to flow in cascade fashion from the highest pond to the next lowest pond. When the waters in these ponds are extremely polluted and filled with solid matter, including debris, they oftentimes will plug the standpipe, thus requiring operators to enter the pond either by means of boats or by wading to clear manually these obstructions. This separation of suspended matter from water can be improved by treating the water with various types of polyelectrolytes. These flocculating and settling agents can derive increased benefit through their action and obtain a much higher quality water than would normally be obtained without their use. One of the problems that has been observed, however, in the use of polyelectrolytes is the control of the feeding rate into a water suspension pond while its volume is varying under conditions of rainfall or in the extreme flooding. Under these types of conditions as well as under drought conditions when essentially no water flow exists, the treatment with polyelectrolyte is often inadequate due to either gross under-treatment in relation to the amount of polyelectrolyte needed to efficiently remove suspended matter from the water being treated, or gross over-treatment which is wasteful of polyelectrolyte and costly to the operator.

OBJECTS

An object of this invention is to provide an apparatus and procedure for controlling the amount and quality of effluent waters being discharged from an industrial mine site. Another object is to provide automatic control to stop the feed of polyelectrolyte when it is not needed due to low water conditions in the pond. A further object is to provide a device that can accomplish this in such a manner as to de-emphasize the necessity of operators.

THE DRAWINGS

The invention is shown to best advantage in the drawings of which

In the drawings, like parts have like numbers.

Figure 1:
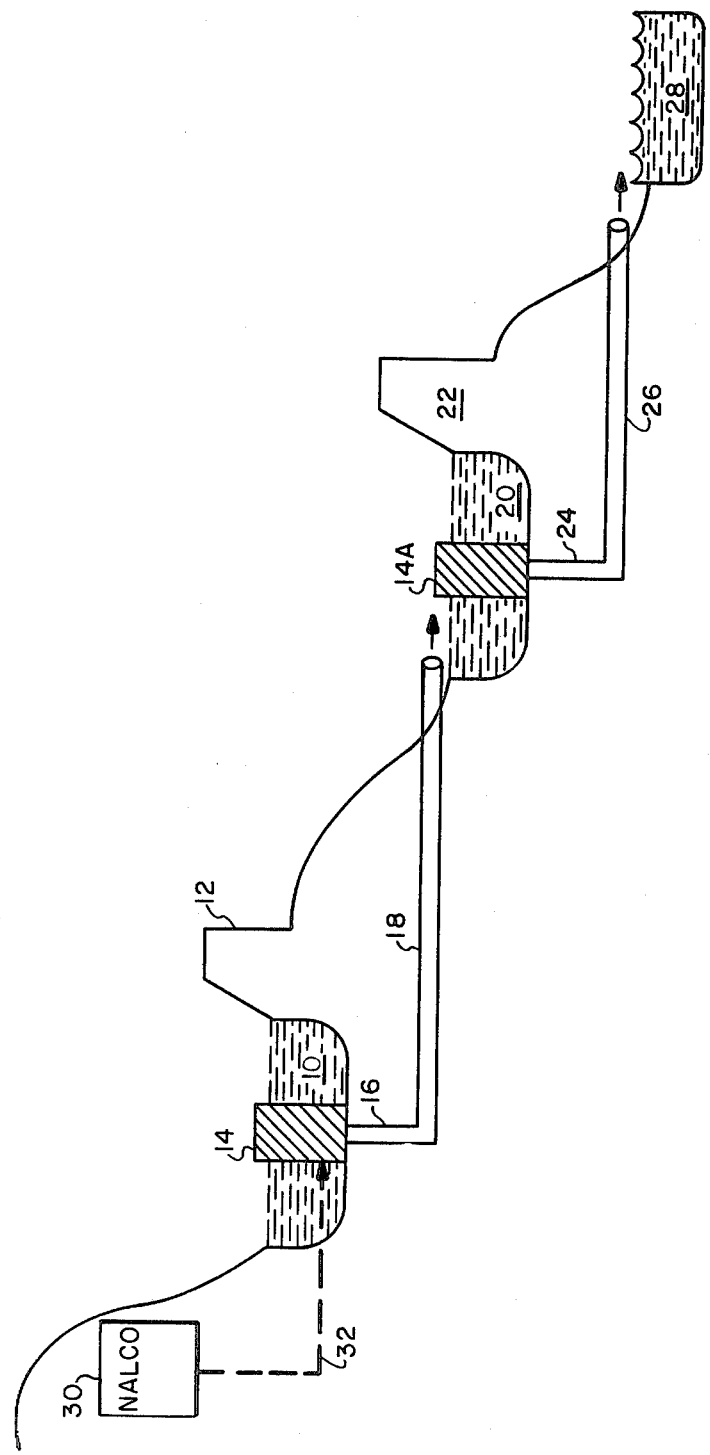
FIG. 1 shows a typical ponding system for handling minor runoff water whereby it is clarified in two ponds and then delivered to a body of water such as a stream.

With more specific reference to the drawings and, in particular, FIG. 1, there is shown a first pond 10 which is contained by a dam 12. In the center of the pond there is a standpipe fitted with the apparatus of the invention, which combination is generally designated by the numeral 14. The standpipe 16 is fitted into drainline 18 which empties into second pond 20 which is contained by second dam 22. In a similar fashion, this pond is fitted with the apparatus of the invention 14 with its standpipe 24 being connected through drainline 26 which empties into discharge stream such as a pond or lake 28.

Ahead of apparatus 14 is polymer supply tank 30 which supplies polymer by gravity feed through line 32 to apparatus 14. Although not shown, line 32 may be fitted with a flow control or regulating valve which meters the exact amount of polymer necessary to treat the water in pond 10 to remove the suspended matter therefrom. It may be T'd to supply polymer to pond 20. The particular amount is, of course, dependent upon the polymer used and the nature of the suspended matter in the pond 10.

Figure 2:
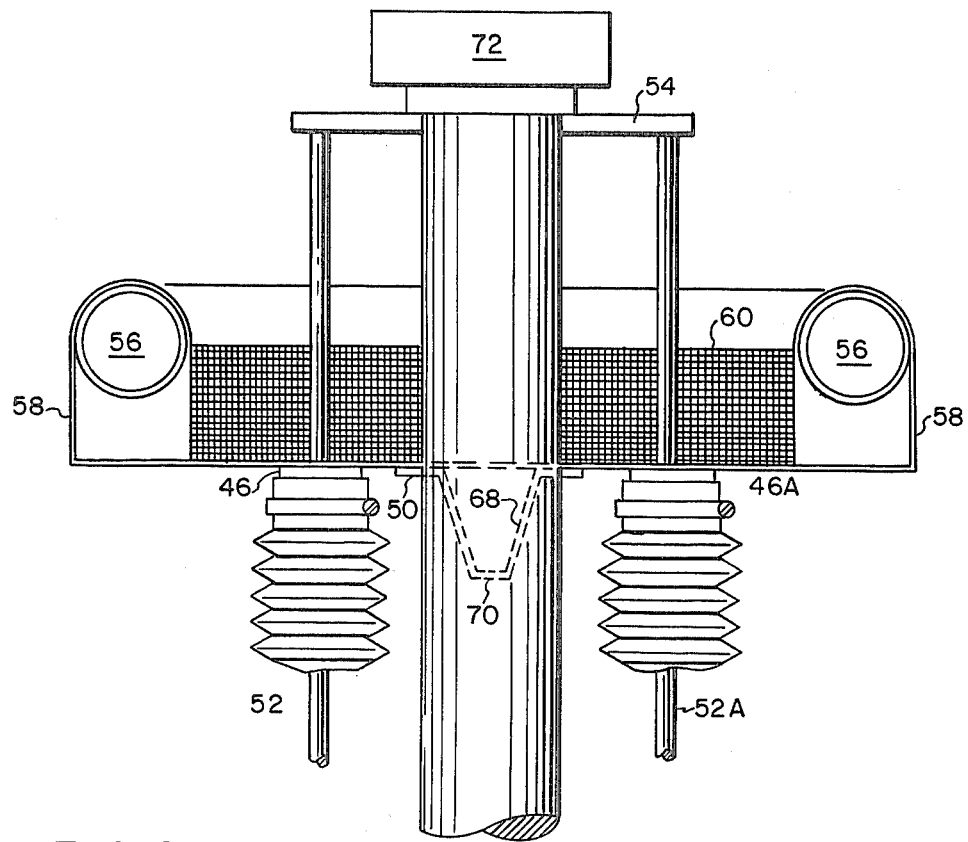
FIG. 2 is a vertical plane view, broken away in part, showing a preferred mode of the invention.
Figure 2:
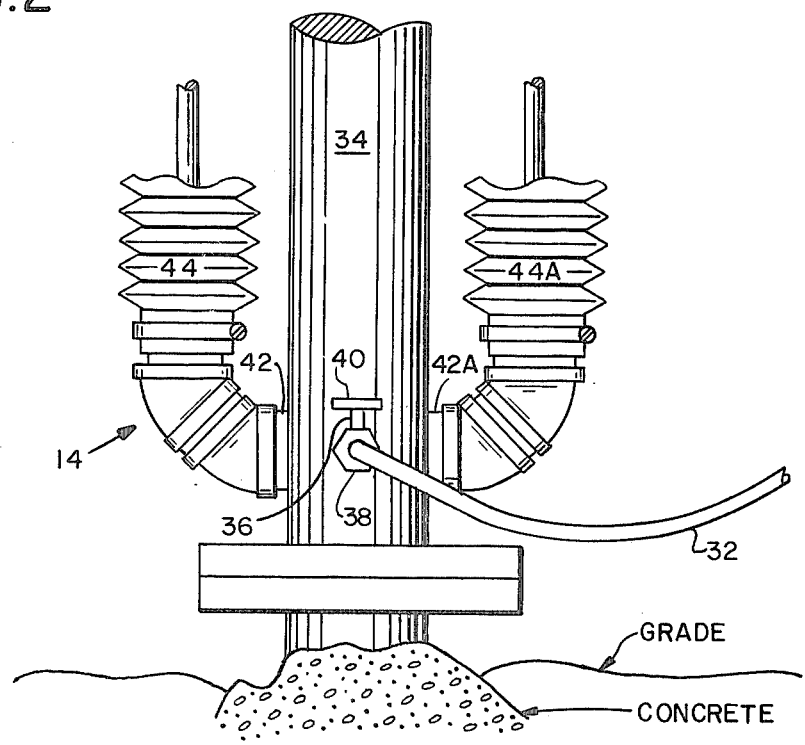
Figure 3:
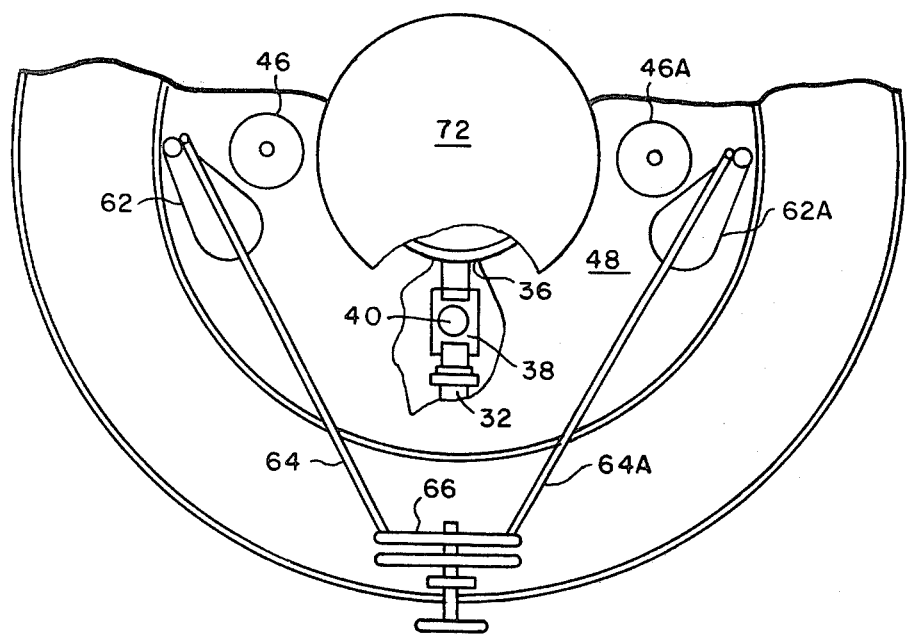
FIG. 3 is a top plane view.

For a better understanding of how the apparatus used in the invention is employed, reference may be specifically had to FIGS. 2 and 3 wherein apparatus 14 is shown in greater detail. Specifically, the apparatus comprises a standpipe 16. The bottom of the standpipe contains a polymer feed inlet 36 which is fitted with valve 38. The shutoff mechanism of the valve is spring actuated such that when handle 40 is depressed, the valve is shut off. Valve 38 is connected to the end of polymer feed line 32. Also located near the bottom of standpipe 16 are a pair of opposed discharge inlets 42 and 42a. Each opening is connected by a flexible hose 44 and 44a to openings 46 and 46a which are located in a horizontally disposed plate 48. The plate is circular in shape and has a center opening 50 which allows the plate to move up and down on the standpipe 16. To insure a smooth movement of the plate 48 on the standpipe 16, there is additionally provided a pair of guides 52 and 52a located within the flexible hoses 44 and 44a respectively. These guides extend through the plate and are fastened to horizontally positioned stop 54 which is rigidly fashioned to the standpipe 34.

The top surface of the horizontal plate is fitted with a donut-shaped float 56 which is held above the plate by means of clips 58. Fastened to the top of the plate is a circular screen or filter 60 which is of such a diameter as to circumscribe within its boundaries the openings 46 and 46a. The openings 46 and 46a may be partially closed by means of tear-shaped covers 62 and 62a which are pivotally connected through arms 64 and 64a to screw assembly 66. By adjusting the screw assembly 66, it is possible to partially close the openings 46 and 46a by means of tear-shaped covers 62 and 62a.

The bottom of the plate member is fitted with an inverted Frustro conical plunger 68 whose bottom 70 is adapted to directly contact valve handle 40 when the plate is in the downward postion.

The top of the standpipe 34 is fitted with trash cap 72 to block obstructions in the event the run off effluent exceeds the dams design criteria, thus allowing for immediate additional overflow relief.

The drawing shows that the apparatus, when used, would normally rest at the water level shown generally by numeral 74. At this particular setting, water would continually pass through the screen filter and into the openings 46 and 46a where it would be carried through flexible hoses 44 and 44a into the bottom interior of the standpipe 16. This flow of water would continually be treated by polymer being fed through inlet 36. If, for some reason, the water level in the pond would become excessively low, the plate would ride down the standpipe and the Frustro conical plunger 68 would engage the valve handle 40 and shut off the flow of polymer. Thus, it is seen that the device not only controls the feed of polymer, but by means of the tear-shaped covers, it is possible to regulate the flow of water from a settling pond or the like.

It is understood that the apparatus of the invention may be subject to variation without departing from the spirit thereof.

Having thus described our invention, it is claimed as follows:

1. An apparatus for controlling the liquid level of overflow ponds and the like comprising a vertical standpipe having a polymer feed inlet near its bottom, a valve for controlling flow of polymer to the polymer feed inlet, at least 1 fluid discharge inlet near the bottom of the vertical standpipe, flexible hose means connecting the fluid discharge inlet to a corresponding opening located in a horizontal plate member which is adapted to ride up and down on the vertical standpipe, said horizontal plate member being fitted with float means, filter means, and valve shut off means.

2. An apparatus for controlling the liquid level of overflow ponds and the like comprising a vertical standpipe having a polymer feed inlet near its bottom, a valve for controlling flow of polymer to the polymer feed inlet, a pair of opposed fluid discharge inlets near the bottom of the vertical standpipe, flexible hose means connecting the fluid discharge inlets to a pair of opposed openings located in a horizontal plate member which is adapted to ride up and down on the vertical standpipe, vertical guide members within the flexible hose means, said guide means extending through the openings of the horizontal plate member to near the top of the vertical standpipe and being rigidly affixed by means of a horizontal stop affixed to the vertical standpipe, float means fitted above the top of the horizontal plate means, a screen filter fitted onto the plate and adapted to prevent solids from entering the openings located in the plate member, adjustable means for regulating the size of the openings located in the horizontal plate member, and valve shut off means located on the bottom of the plate and adapted to shut off the valve when the plate is lowered.

* * * * *